United States Patent
Ahn et al.

(10) Patent No.: US 7,340,269 B2
(45) Date of Patent: Mar. 4, 2008

(54) UPLINK TRANSMISSION POWER CONTROL METHOD

(75) Inventors: Joon Kui Ahn, Seoul (KR); Bong Hoe Kim, Ansan-si (KR); Seung Hoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 562 days.

(21) Appl. No.: 10/771,119

(22) Filed: Feb. 4, 2004

(65) Prior Publication Data

US 2004/0166888 A1 Aug. 26, 2004

(30) Foreign Application Priority Data

| Feb. 4, 2003 | (KR) | .................. 10-2003-0006913 |
| Feb. 6, 2003 | (KR) | .................. 10-2003-0007546 |

(51) Int. Cl.
*H04B 7/00* (2006.01)
*H04Q 7/20* (2006.01)

(52) U.S. Cl. .............. 455/522; 455/442; 455/524; 455/436; 370/318; 370/320; 370/331; 370/332; 370/333; 370/334

(58) Field of Classification Search .............. 455/69, 455/442, 226.1, 226.2, 522, 524, 436–439; 370/342, 318, 320, 331–335
See application file for complete search history.

(56) References Cited

U.S. PATENT DOCUMENTS

| 5,469,471 | A | * | 11/1995 | Wheatley, III | .............. 370/335 |
| 5,815,798 | A | * | 9/1998 | Bhagalia et al. | ............ 455/13.4 |
| 6,269,239 | B1 | * | 7/2001 | Hashem et al. | ................ 455/69 |
| 6,307,844 | B1 | * | 10/2001 | Tsunehara et al. | ............ 370/318 |
| 6,343,218 | B1 | * | 1/2002 | Kaneda et al. | .............. 455/522 |
| 6,411,799 | B1 | * | 6/2002 | Padovani | ....................... 455/69 |
| 6,512,925 | B1 | * | 1/2003 | Chen et al. | ................... 455/442 |
| 6,539,226 | B1 | * | 3/2003 | Furukawa et al. | ........... 455/442 |
| 6,636,746 | B1 | * | 10/2003 | Hashem et al. | .............. 455/522 |
| 6,788,685 | B1 | * | 9/2004 | Holtzman et al. | ........... 370/391 |
| 6,807,429 | B2 | * | 10/2004 | Subrahmanya | ............... 455/522 |
| 2001/0024964 | A1 | | 9/2001 | Wang et al. | |
| 2003/0157955 | A1 | * | 8/2003 | Jarvisalo et al. | ............. 455/522 |
| 2004/0029622 | A1 | | 2/2004 | Laroia et al. | |

FOREIGN PATENT DOCUMENTS

GB 2341294 A * 3/2000

OTHER PUBLICATIONS

International Search Report dated Aug. 24, 2004.

* cited by examiner

*Primary Examiner*—Matthew D. Anderson
*Assistant Examiner*—Sujatha Sharma
(74) *Attorney, Agent, or Firm*—Ked & Associates, LLP

(57) ABSTRACT

Disclosed is an uplink transmission power control method, by which a transmission power of an uplink signal is efficiently controlled while a terminal communicates with a plurality of base stations. The present invention includes the steps of computing command values for a plurality of base stations in a terminal in soft handover with a plurality of the base stations transmitting power control commands to the terminal and lowering uplink transmission power if the command values computed for a plurality of the base stations includes at least one power-down command. And, the present invention includes the steps of receiving a power control command transmitted from at least one base station, computing at least one command value according to the received power control command, and lowering uplink transmission power if the command value includes a transmission power-down command value.

11 Claims, 5 Drawing Sheets

UPLINK TRANSMISSION POWER CONTROL METHOD

This application claims the benefit of the Korean Application Nos. P2003-0006913 filed on Feb. 4, 2003 and P2003-0007546 filed on Feb. 6, 2003 which are hereby incorporated by reference.

BACKGROUND OF THE INVENTION

1. Field of the Invention

The present invention relates to a power control method applied to mobile communication, and more particularly, to an uplink transmission power control method.

2. Discussion of the Related Art

Generally, uplink transmission power control in mobile communication system is essential to enhancement of system reception capacity and efficient terminal power use. An uplink transmission power control method according to a related art is explained as follows.

First of all, a base station receives an uplink transmission signal transmitted from a terminal, and decides whether to have the terminal raise/lower its uplink transmission power according to the transmitted signal. The base station then transmits a transmission power control command to the terminal according to the decision.

The terminal (UE; user equipment) receives the transmission power control commands transmitted from the base station (node-B), and determines the uplink transmission power according to the power control commands. The terminal then performs uplink transmission according to a result of the determination to accomplish the uplink transmission power control.

The uplink transmission power control method is explained in detail as follows.

Referring to FIG. 1, a terminal receives transmission power control commands transmitted from one base station. In case that the entire power control commands received for a predetermined continuous time slot indicate 'transmission power increase', the terminal decides to raise uplink transmission power.

Otherwise, if the entire transmission power control commands received for the predetermined continuous time slot indicate 'transmission power decrease', the terminal decides to lower the uplink transmission power.

Meanwhile, in case that the transmission power control commands received for several time slots indicate 'transmission power increase' and that another power control commands received for another several times slots indicate 'transmission power decrease', the terminal determines to maintain the transmission power. And, the terminal lowers, raises, or maintains the uplink transmission power according to a result of the determination. In uplink transmission power, a method of controlling transmission power by determining one of three states including increase/decrease/maintain is called a 3-states power control method.

SUMMARY OF THE INVENTION

Accordingly, the present invention is directed to an uplink transmission power control method that substantially obviates one or more problems due to limitations and disadvantages of the related art.

An object of the present invention is to provide an uplink transmission power control method, by which a transmission power of an uplink signal is efficiently controlled while a terminal communicates with a plurality of base stations.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an uplink transmission power control method according to the present invention includes the steps of computing command values for a plurality of base stations in a terminal in soft handover with a plurality of the base stations transmitting power control commands to the terminal and lowering uplink transmission power if the command values computed for a plurality of the base stations includes at least one power-down command.

In another aspect of the present invention, an uplink transmission power control method includes the steps of receiving a power control command transmitted from at least one base station, computing at least one command value according to the received power control command, and lowering uplink transmission power if the command value includes a transmission power-down command value.

In case that the terminal enables to maintain a quality of communication while communicating with a plurality of the base stations, the present invention lowers the uplink transmission power of the terminal to use the power of the terminal efficiently and to operate the base stations stably.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In soft handover, a plurality of base stations participate in power control of one terminal. Hence, the terminal (UE; user equipment) receives power control commands from at least one or more base stations and should determine uplink transmission power according to the received commands.

Figure 1:
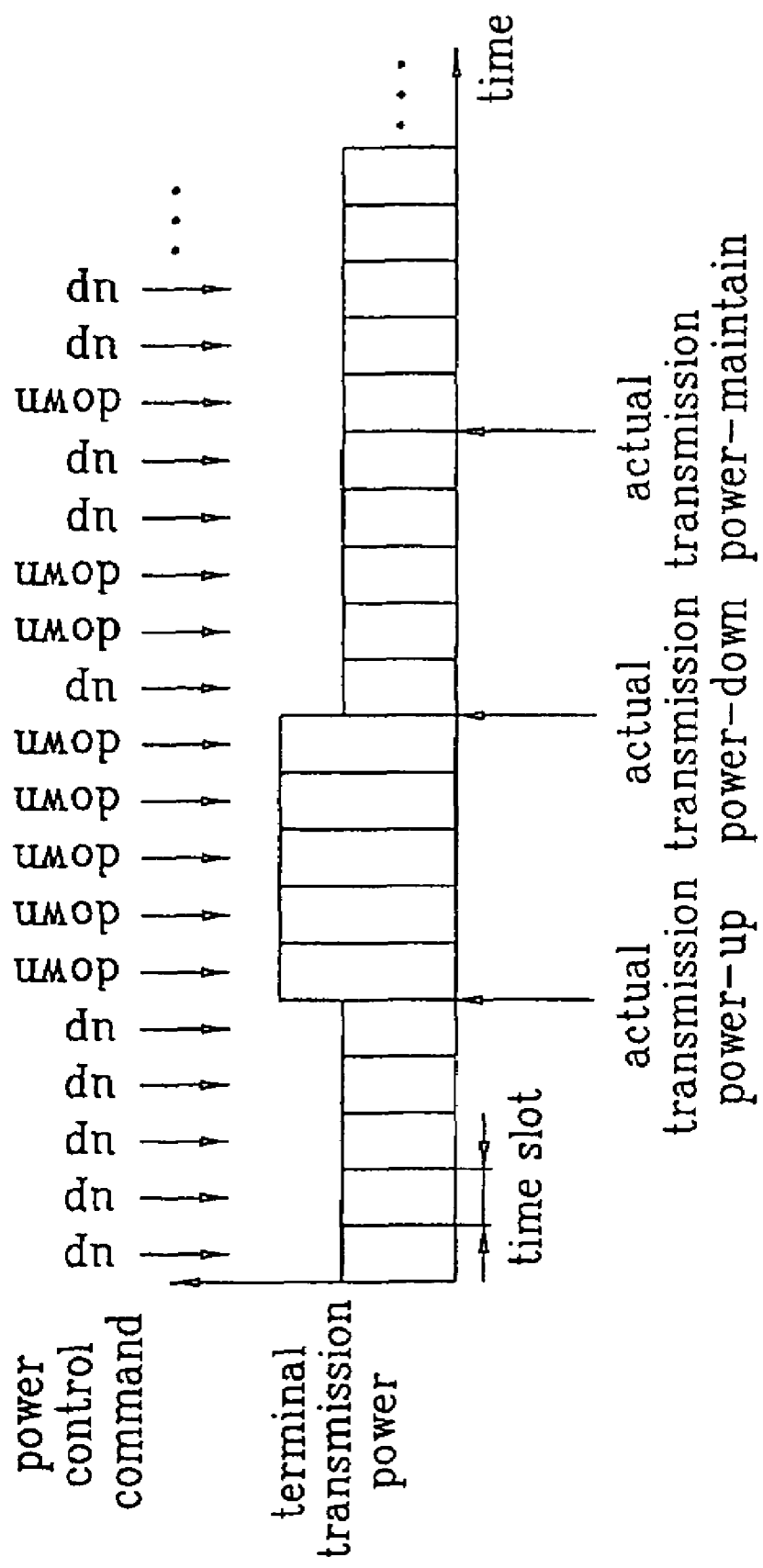
FIG. 1 is a diagram of a method of controlling uplink transmission power according to a control command received from one base station.
Figure 2:
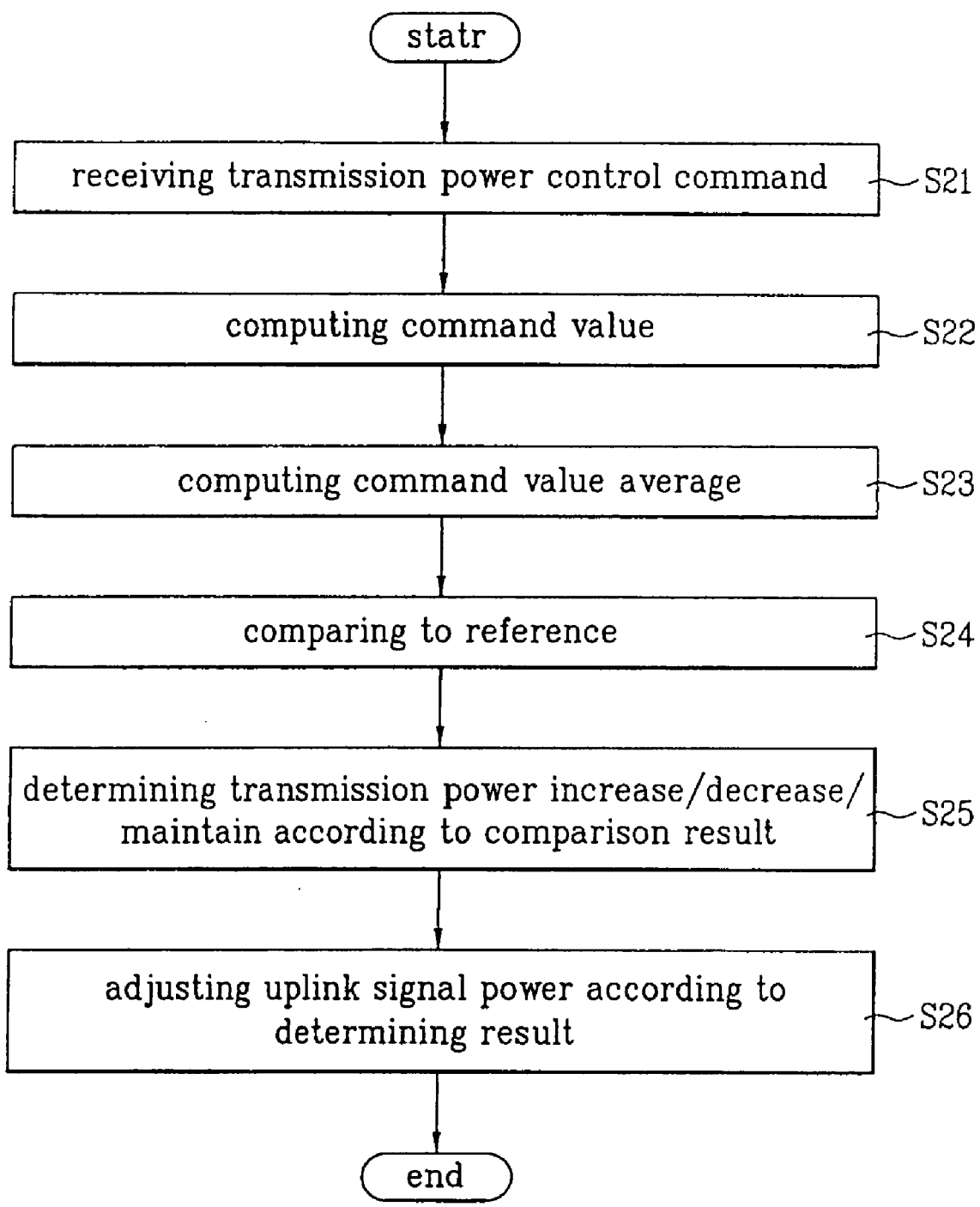
FIG. 2 is a flowchart of a method of controlling uplink transmission power in soft handover in accordance with control commands received from a plurality of base stations according to one embodiment of the present invention.

FIG. 2 is a flowchart of a method of controlling uplink transmission power in soft handover in accordance with control commands received from a plurality of base stations according to one embodiment of the present invention.

Referring to FIG. 2, uplink transmission power of a terminal in soft handover is controlled in a following manner.

First of all, a method of determining whether to raise, lower, or maintain transmission power is the same of a case that the handover is not performed.

Yet, as at least one base station is involved in communicating with a terminal, each base station transmits an independent transmission power control command. Hence, the transmission power control command transmitted from one base station may be different from power control commands transmitted from other base stations. Namely, a base station A keeps transmitting the transmission power increase commands for a predetermined time slot, whereas a base station B keeps transmitting the transmission power decrease commands for the time slot.

In such a case, the terminal receives the transmission power control command transmitted from an $i^{th}$ base station (S21) to compute a constant command value $TPC_{tempi}$ (S22). For instance, a transmission power decrease command is computed as '−1' ($TPC_{tempi}=-1$), a transmission power maintain command is computed as '0' ($TPC_{tempi}=0$), and a transmission power increase command is computed as '1' ($TPC_{tempi}=1$). And, an average value of the commands is computed (S23) to be compared to a predetermined reference value (S24). As a result of the comparison, it is determined whether to raise, lower, or maintain the transmission power (S25). For example, if the average value is smaller than a lower reference, it is determined to lower the transmission power. If the average value is greater than an upper reference, it is determined to raise the transmission power. In other cases, it is determined to maintain the transmission power. As a result of the determination, the power in transmitting next uplink signals is then raised, lowered, or maintained (S26).

Yet, in the above-explained cases, there exist the following problem. It is assumed that one terminal is in handover between two base stations. First of all, when a base station A keeps transmitting transmission power increase commands for a predetermined time slot, the terminal judges a determination value of the transmission power control command of the base station A as '1'. Meanwhile, when the other base station B keeps transmitting transmission power decrease commands for the predetermined time slot, the terminal judges the determination value of the transmission power control command of the base station B as '−1'. Simultaneously communicating with both of the base stations A and B in soft handover, the terminal is allowed to maintain a quality of uplink communication for one of two base stations.

However, if an average of the determination value is simply compared to the lower or upper value of the reference to determine whether to raise/lower/maintain the transmission power, the transmission power is maintained or raised instead of being lowered. So, it is unable to perform reverse power control efficiently.

Figure 3:
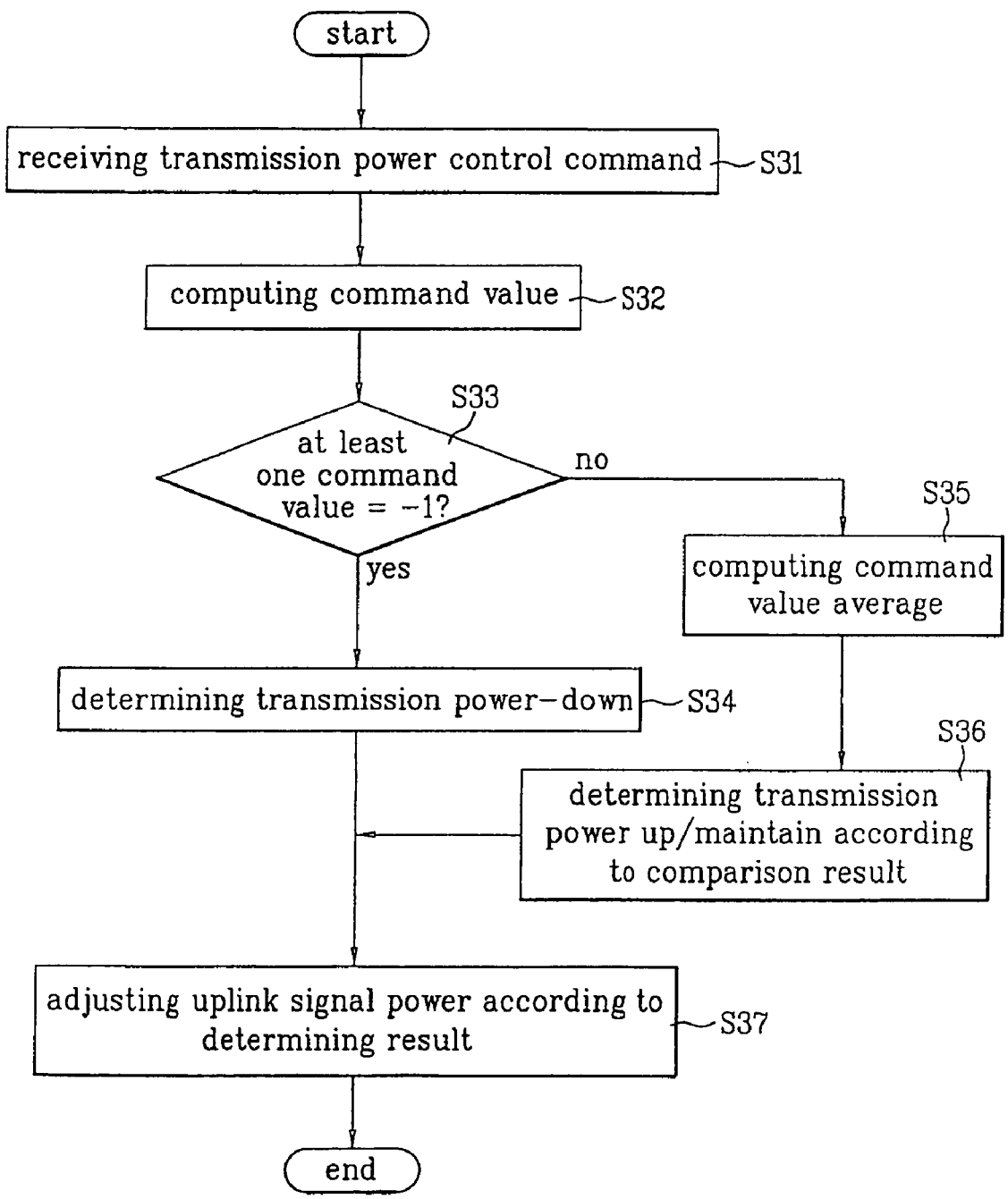
FIG. 3 is a flowchart of a method of controlling uplink transmission power in soft handover in accordance with control commands received from a plurality of base stations according to another embodiment of the present invention.

FIG. 3 is a flowchart of a method of controlling an uplink power in soft handover in accordance with control commands received from a plurality of base stations according to another embodiment of the present invention.

Referring to FIG. 3, each base station receives an uplink signal transmitted from a terminal connected to the corresponding base station, and transmits a power control command determined according to a quality of the received uplink signal to the terminal (S31). In doing so, the quality of the signal, which was transmitted from the terminal and received by the respective base stations, may differ from each other since channel environments between the terminal and the respective base stations may differ from each other. Hence, the power control commands transmitted from the respective base stations to the terminal may differ from each other.

Namely, each of the base stations independently transmits the transmission power control command, which is determined according to the separately received uplink signal quality information, to the terminal. In doing so, each of the base stations transmits the power control command to the terminal in each time slot. A command value computing unit included in the terminal then computes a command value $TPC_{tempi}$ using the power control commands transmitted from the respective base stations for predetermined time slots (S32).

In this case, the command value $TPC_{tempi}$ can be calculated by regarding five time slots as one unit. Namely, in case that the entire power control commands received for the five time slots indicate 'transmission power increase', the command value can be computed as '1 ($TPC_{tempi}=1$)'. Moreover, in case that the entire power control commands received for the five time slots indicate 'transmission power decrease', the command value can be computed as '−1 ($TPC_{tempi}=-1$)'. Otherwise, the command value can be computed as '0 ($TPC_{tempi}=0$)'.

In computing the command value by unit of five time slots, each five time slots can be grouped by taking a first time slot of each radio frame as a reference. Namely, as one radio frame consists of fifteen time slots, the power control command values can be computed by dividing the radio frame by five time slots unit from the first time slot.

Once the power control command values are computed, it is checked whether there exists 'transmission power decrease ($TPC_{tempi}=-1$)' exists among the command values (S33). If any one of N command values for a plurality of the base stations indicates the 'transmission power decrease ($TPC_{tempi}=-1$)', it is determined to lower the transmission power of the uplink signal (S34).

If the power control command values for a plurality of the base stations indicate 'transmission power increase ($TPC_{tempi}=1$)' or 'transmission power maintain ($TPC_{tempi}=0$)', an average of the command values is found by Equation 1 or 2. The average of the command values is then compared to a predetermined reference value α to determine whether to raise or maintain the uplink transmission power.

Namely, in case that none of the base stations has ever transmitted the decrease command ($TPC_{tempi}=-1$), the average of the power command values is found (S35). And, the found average is compared to the predetermined reference value to determine uplink transmission power (S36). In accordance with the determined transmission power, the uplink signal is transmitted (S37). Such a process is explained in detail as follows.

First of all, the terminal finds an average of power adjustment values of a plurality of the base stations using Equation 1 or 2 (S33), and compares the average to the reference value (S34).

$$\frac{1}{N}\sum_{i=0}^{N} TPC_{tempi} > \alpha \quad \text{[Equation 1]}$$

$$\frac{1}{N}\sum_{i=0}^{N} TPC_{tempi} \geq \alpha \quad \text{[Equation 2]}$$

In Equation 1 or 2, 'N' indicates the number of the base stations, 'i' is an integer increasing 1 to N, $TPC_{tempi}$ represents the command value corresponding to an $i^{th}$ base station, and 'α' is a predetermined constant as a reference value for power control.

In the embodiment of the present invention, a power control command transmitted from an arbitrary base station can be expressed by three kinds of command values such as '0' for transmission power maintain, '1' for transmission power increase, and '−1' for transmission power decrease. Hence, the average of the command values can be computed as '0', '1', or a decimal fraction smaller than 1.

Yet, if none of N power adjustment values for a plurality of the base stations is 'transmission power decrease ($TPC_{tempi}=-1$)' and the average value of the power command values is greater than the predetermined reference value like Equation 1, it is determined to raise the uplink transmission power of the terminal. If none of N power adjustment values for a plurality of the base stations is 'transmission power decrease ($TPC_{tempi}=-1$)' and the average value of the power command values is equal to or smaller than the predetermined reference value, it can be determined to maintain the transmission power of the uplink signal transmitted from the terminal.

Meanwhile, if none of N power adjustment values for a plurality of the base stations is 'transmission power decrease ($TPC_{tempi}=-1$)' and the average value of the power command values is equal to or greater than the predetermined reference value like Equation 2, it can be determined to raise the uplink transmission power of the terminal. If none of N power adjustment values for a plurality of the base stations is 'transmission power decrease ($TPC_{tempi}=-1$)' and the average value of the power command values is smaller than the predetermined reference value, it can be determined to maintain the transmission power of the uplink signal transmitted from the terminal.

As mentioned in the foregoing description, in case that the terminal is communicating with a plurality of the base stations in soft handover, successful communication is possible if an uplink communication quality is met for one of the base stations. Hence, if the command value of 'transmission power decrease ($TPC_{tempi}=-1$)' exists among the power control commands transmitted from the base stations, it can be determined to lower the uplink transmission power regardless of the command values for other base stations. Moreover, if one of the command values among a plurality of the base stations indicates 'transmission power decrease ($TPC_{tempi}=-1$)', it is determined to lower the uplink transmission power without computing the average of the command values.

The reference value a can be appropriately selected according to how to set up an increase frequency of the terminal transmission power. For instance, it frequently happens that the transmission power needs to be raised, as the reference value gets smaller. Yet, as the reference value gets smaller, the case that the transmission power needs to be raised is reduced. Thus, by adjusting the increase frequency that raises the uplink transmission power of the terminal, the average power received by the base station(s) can be controlled.

In the present invention, the reference value is set to 0, 0.5, 1, etc. to operate the terminal using the 3-states power control method. Namely, if the entire command values indicate 'increase', the transmission power is raised. Yet, if the 'increase' command and the 'maintain' command simultaneously exist, the uplink power is controlled by changing the reference value in a manner that an operator of a terminal or a communication system providing a communication service to the terminal performs the power control with a certain degree of reliability of the power command value of the 'maintain'.

For instance, if the reference value is set to '0', the operator of the terminal or communication system intends to perform the power control with the low reliability of the 'maintain' power command value. Namely, if the 'increase' command from at least one base station exists among the power control commands transmitted from a plurality of the base stations, it is controlled to raise the uplink transmission power.

For another instance, if the reference value is set to '1', the operator of the terminal or communication system intends to perform the power control with the relatively high reliability of the 'maintain' power command value. Namely, if the commands transmitted from a plurality of the base stations are 'increase' only, it is controlled to raise the uplink transmission power.

Results of uplink transmission power by applying Equation 1 when the reference value is '0.5' are shown in Table 1.

TABLE 1

| | Case 1 | Case 1 | Case 3 | Case 4 | Case 5 | Case 6 | Case 7 | Case 8 | Case 9 |
|---|---|---|---|---|---|---|---|---|---|
| TPC_temp1 | −1 | −1 | −1 | 0 | 0 | 0 | 1 | 1 | 1 |
| TPC_temp2 | −1 | 0 | 1 | −1 | 0 | 1 | −1 | 0 | 1 |
| Trans. power | Down | Down | Down | Down | Maintain | Maintain | Down | Maintain | Up |

Referring to Table 1, if one of the command values ($TPC_{tempi}$) for two base stations is 'decrease (down, −1)', it is determined to lower the uplink transmission power. Otherwise, the average value is calculated by Equation 1, for example, to be compared to the reference value '0.5'. The 'transmission power increase (up)' is determined only if the average value is greater than the reference value '0.5'. And, the 'transmission power maintain' is determined if the average value is equal to or smaller than the reference value '0.52'.

Results of uplink transmission power by applying Equation 2 when the reference value is '1' are shown in Table 2.

TABLE 2

|          | Case 1 | Case 1 | Case 3 | Case 4 | Case 5   | Case 6 | Case 7 | Case 8 | Case 9 |
|----------|--------|--------|--------|--------|----------|--------|--------|--------|--------|
| TPC_temp1 | −1    | −1     | −1     | 0      | 0        | 0      | 1      | 1      | 1      |
| TPC_temp2 | −1    | 0      | 1      | −1     | 0        | 1      | −1     | 0      | 1      |
| Trans. power | Down | Down | Down | Down | Maintain | Up     | Down   | Up     | Up     |

Referring to Table 2, if one of the command values ($TPC_{tempi}$) for two base stations is 'decrease (down, −1)', it is determined to lower the uplink transmission power. Otherwise, the average value is calculated by Equation 1, for example, to be compared to the reference value '1'. The 'transmission power increase (up)' is determined only if the average value is equal to or greater than the reference value '1'. And, the 'transmission power maintain' is determined if the average value is smaller than the reference value '1'.

As can be seen by Table 1 and Table 2 if the uplink communication quality transmitted to at least one or more base stations is guaranteed despite the transmission power decrease of the terminal in soft handover, the uplink transmission power is lowered. Hence, the transmission power can be lowered as well as the communication quality of a desirable level is maintained, whereby efficient transmission power control can be achieved. Meanwhile, in case of controlling transmission power using the reference value, averaged reception power of the corresponding base station can be controlled by setting up the reference value appropriately to adjust the increase frequency of the transmission power.

Figure 4:
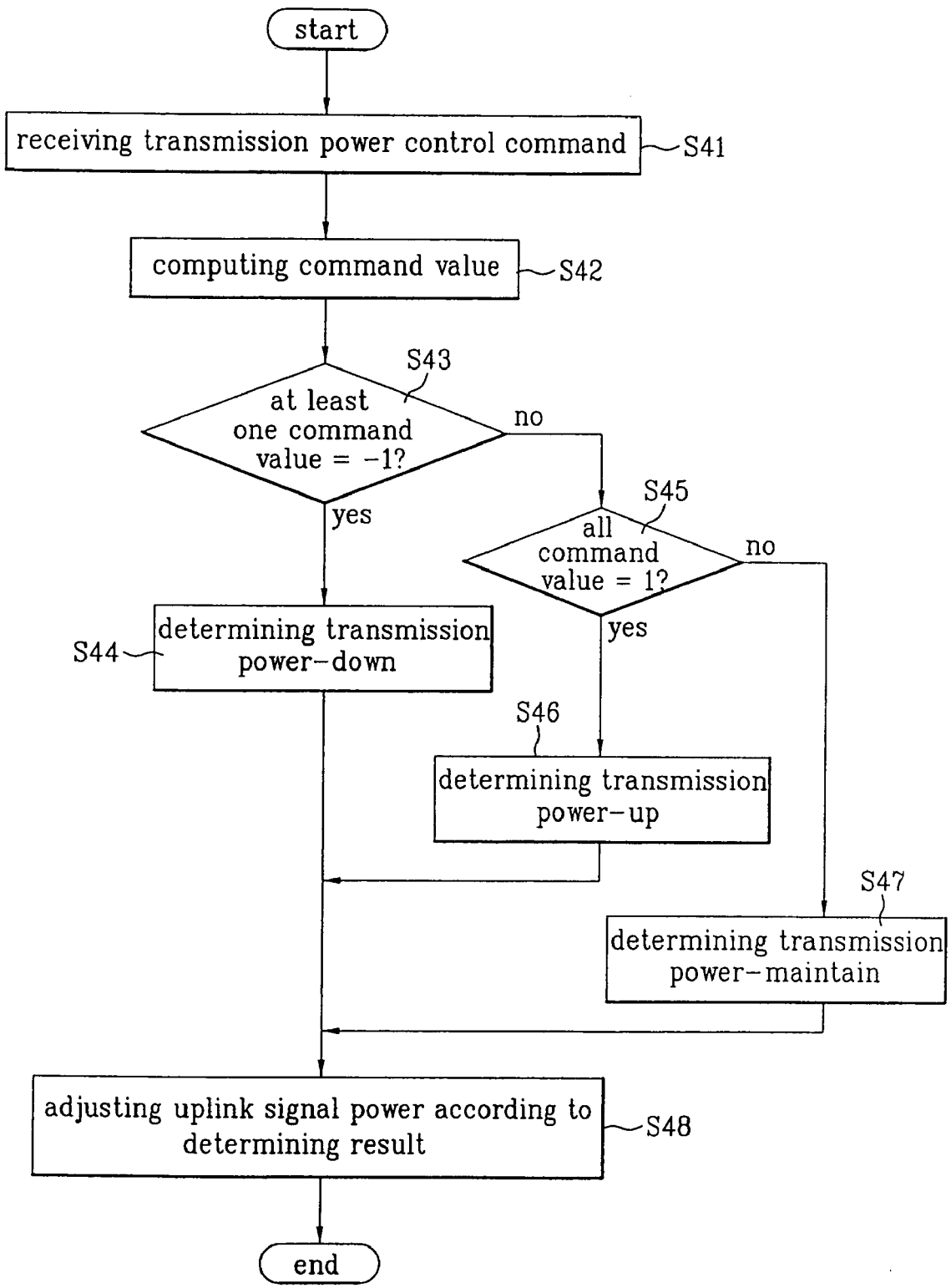
FIG. 4 is a flowchart of a method of controlling uplink transmission power in soft handover in accordance with control commands received from a plurality of base stations according to a further embodiment of the present invention.

FIG. 4 is a flowchart of a method of controlling an uplink power in soft handover in accordance with control commands received from a plurality of base stations according to a further embodiment of the present invention.

Referring to FIG. 4, each base station receives an uplink signal transmitted from a terminal connected to the corresponding base station, and transmits a power control command determined according to a quality of the received uplink signal to the terminal (S41).

As mentioned in the foregoing description, each of the base stations independently transmits the transmission power control command, which is determined according to the separately received uplink signal quality information, to the terminal. In doing so, each of the base stations transmits the power control command to the terminal in each time slot.

A command value computing unit included in the terminal then computes a command value $TPG\_temp_i$ using the power control commands transmitted from the respective base stations for predetermined time slots (S42).

In this case, the command value $TPC\_temp_i$ can be calculated by regarding five time slots as one unit. In case that the entire power control commands received for the five time slots indicate 'transmission power increase', the command value can be computed as '1 ($TPC\_temp_i=1$)'. Moreover, in case that the entire power control commands received for the five time slots indicate 'transmission power decrease', the command value can be computed as '−1 ($TPC\_temp_i=-1$)'. Otherwise, the command value can be computed as '0 ($TPC\_temp_i=0$)'.

Moreover, in computing the command value by unit of five time slots, each five time slots can be grouped by taking a first time slot of each radio frame as a reference.

Once the power control command values are computed, it is checked whether there exists 'transmission power decrease ($TPC\_temp_i=-1$)' among the command values (S43). If any one of N command values for a plurality of the base stations indicates the 'transmission power decrease ($TPC\_temp_i=-1$)', it is determined to lower the transmission power of the uplink signal (S44). Meanwhile, if the entire power control command values for a plurality of the base stations indicate 'transmission power increase ($TPC\_temp_i=1$)' only, it is determined to raise the transmission power of the uplink signal (S46). Otherwise, it is determined to maintain the transmission power of the uplink signal (S47). In accordance with a result of the determination, the uplink signal is then transmitted (S48).

Referring to FIG. 4, the uplink transmission power can be determined using the command received from each base station without setting up the reference value. Namely, if at least one of the command values ($TPC\_temp_i$) determined according to the power control commands transmitted from a plurality of the base stations is the 'transmission power decrease (−1)', it is determined to lower the transmission power. Meanwhile, if the entire command values determined according to the power control commands transmitted from the respective base stations are 'transmission power increase (1)', it is determined to raise the transmission power. Otherwise, it is determined to maintain the transmission power as it is. Table 3 shows a method of determining uplink transmission power according to the above-explained method.

TABLE 3

|          | Case 1 | Case 1 | Case 3 | Case 4 | Case 5   | Case 6   | Case 7 | Case 8   | Case 9 |
|----------|--------|--------|--------|--------|----------|----------|--------|----------|--------|
| TPC_temp1 | −1    | −1     | −1     | 0      | 0        | 0        | 1      | 1        | 1      |
| TPC_temp2 | −1    | 0      | 1      | −1     | 0        | 1        | −1     | 0        | 1      |
| Trans. power | Down | Down | Down | Down | Maintain | Maintain | Down   | MainTain | Up     |

Referring to Table 3, if the command value from at least one base station is 'decrease (down, −1)', it is determined to lower the transmission power. Yet, the transmission power is raised only if the entire command values from the base stations are 'increase (up, 1)'. Otherwise, the transmission power is maintained.

Figure 5:
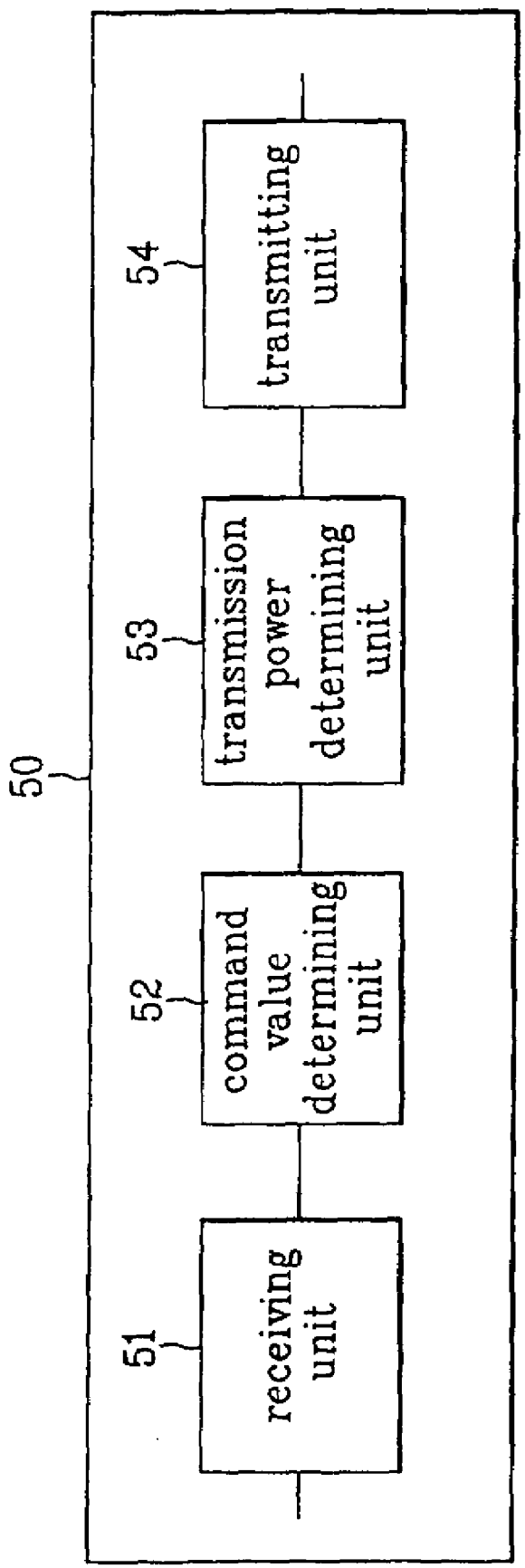
FIG. 5 is a block diagram of a terminal for controlling transmission power of an uplink signal according to a preferred embodiment of the present invention.

FIG. 5 is a block diagram of a terminal for controlling a transmission power of an uplink signal according to a preferred embodiment of the present invention.

Referring to FIG. 5, a terminal 50 according to the present invention includes a receiving unit 51, a command value computing unit 52, a transmission power determining unit 53, and a transmitting unit 54.

The receiving unit 51 receives power control commands from at least one or more base stations.

The command value computing unit 52 computes command values (TPC_temp$_i$) according to the power control commands received from the respective base stations. Namely, the command values (TPC_temp$_i$) are computed according to the power control commands received from the respective base stations for a time slot having a predetermined length.

The transmission power determining unit 53 finds an average of adjustment values, and compares the average to reference values to determine whether to raise, lower, or maintain uplink transmission power.

And, the transmitting unit 54 raises, lowers, or maintains the uplink transmission power according to a determination result of the transmission power determining unit 53.

Accordingly, when the terminal enables to maintain a quality of communication while communicating with a plurality of the base stations, the present invention lowers the uplink transmission power of the terminal to use the power of the terminal efficiently and to operate the base stations stably.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An uplink transmission power control method comprising:
   computing command values for a plurality of base stations in a terminal in soft handover with a plurality of the base stations transmitting power control commands to the terminal; and
   lowering uplink transmission power if the command values computed for the plurality of the base stations includes at least one power-down command,
   wherein each of the command values is for each of the plurality of base stations, and the command values computed are computed through the power control commands in 5 consecutive slots from each of the plurality of the base stations.

2. The uplink transmission power control method of claim 1, if there is not the power-down command among the command values computed for the plurality of the base stations, the method further comprising raising the uplink transmission power if a number of the command values computed as power-up commands outnumber a number of the command values computed as power-maintain commands.

3. The uplink transmission power control method of claim 1, wherein if there is not the power-down command among the command values computed for the plurality of the base stations, the method further comprising maintaining the uplink transmission power if the number of the command values computed as the power-up commands are smaller than or equal to the number of command values computed as the power-maintain commands.

4. The uplink transmission power control method of claim 1, wherein if there is not the power-down command among the command values computed for the plurality of the base stations, the method further comprising raising the uplink transmission power if the entire command values computed indicate transmission power increase.

5. An uplink transmission power control method comprising:
   receiving a power control command transmitted from at least one base station;
   computing at least one command value according to the received power control command;
   lowering uplink transmission power if any of the command value are computed as a transmission power-down command value;
   computed an average of the command value if there is no command value computed as the transmission power-down command value; and
   comparing the computed average of the command value to a reference value and raising or maintaining the uplink transmission power according to a result of the comparing.

6. The uplink transmission power control method of claim 5, wherein the command value is 1 for transmission power-up, 0 for transmission power-maintain, or −1 for the transmission power-down.

7. The uplink transmission power control method of claim 6, wherein the reference value is 0.5.

8. The uplink transmission power control method of claim 7, wherein, in the raising or maintaining the uplink transmission power according to the result of the comparing, the uplink transmission power is raised if the average of the command value exceeds 0.5 or is maintained if the average of the command value is equal to or smaller than 0.5.

9. The uplink transmission power control method of claim 7, wherein, in the raising or maintaining the uplink transmission power according to the result of the comparing, the uplink transmission power is raised if the average of the command value is equal to or greater than 0.5 or is maintained if the average of the command value is smaller than 0.5.

10. An uplink transmission power control method comprising:
    computing command values for a plurality of base stations in a terminal in soft handover with a plurality of the base stations transmitting power control commands to the terminal; and
    raising the uplink transmission power if a number of the command values computed as power-up commands outnumber a number of the command values computed as power-maintain commands, wherein the command value computing computes the command value corresponding to transmission power-up for a corresponding base station of the plurality of base stations if transmission power-up commands keep being transmitted from the corresponding base station for five time slots, the command value corresponding to transmission power-down for the corresponding base station if transmission power-down commands keep being transmitted from the corresponding base station for the five time slots, or the command value corresponding to transmission power-maintain, otherwise.

11. The uplink transmission power control method of claim 10, wherein a reference slot of the five time slots is a first time slot of a radio frame.

* * * * *